Nov. 27, 1951    J. A. STARR    2,576,546
METHOD OF MAKING BRUSHES
Filed Oct. 7, 1948    9 Sheets-Sheet 4
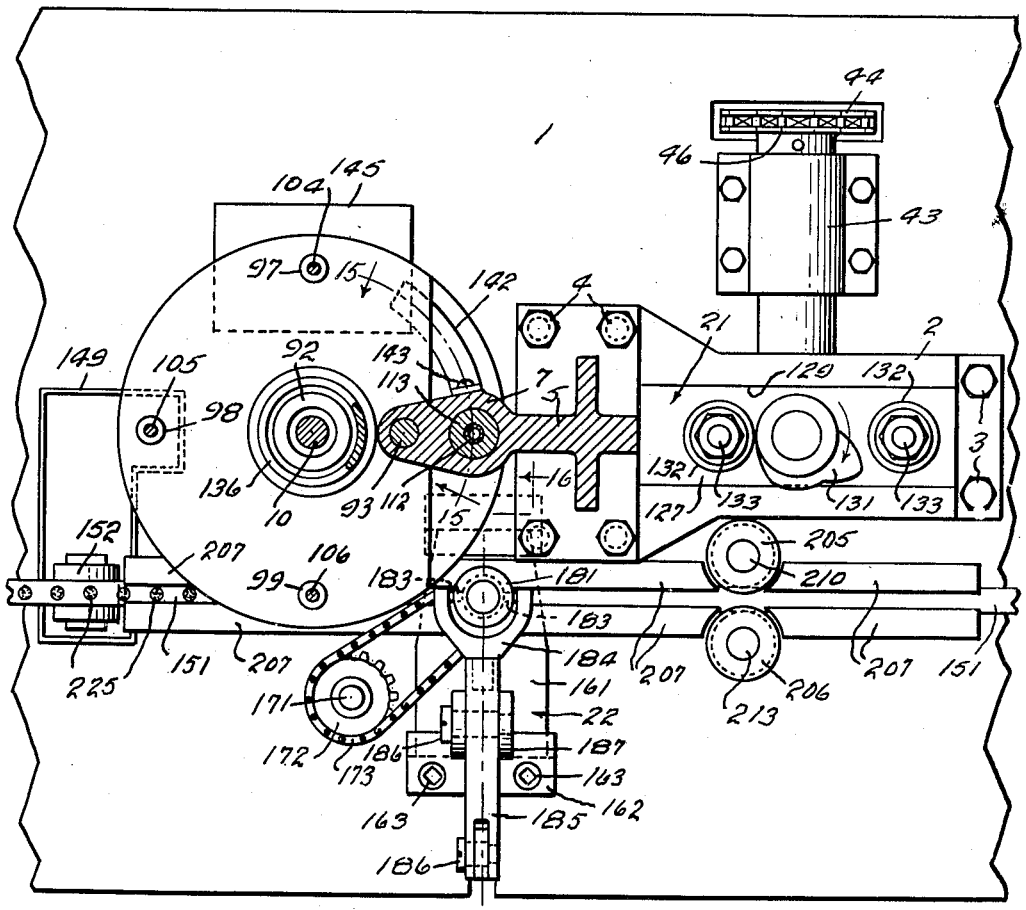
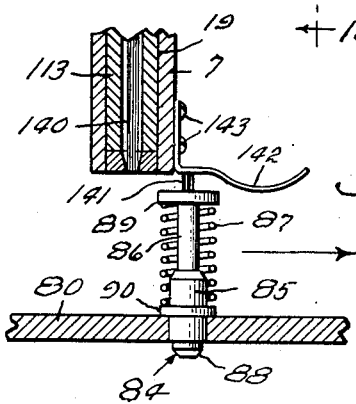
INVENTOR.
John A. Starr
BY *Victor D. Borst*
Atty.

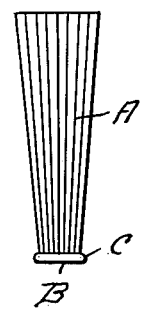
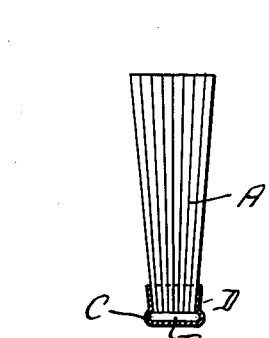
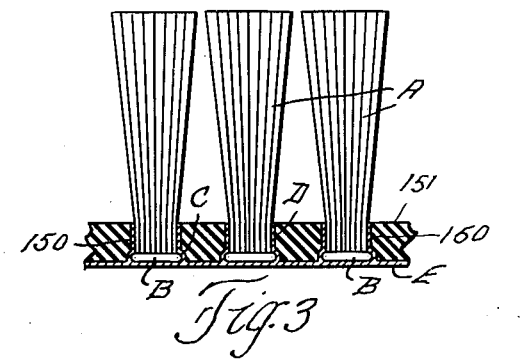
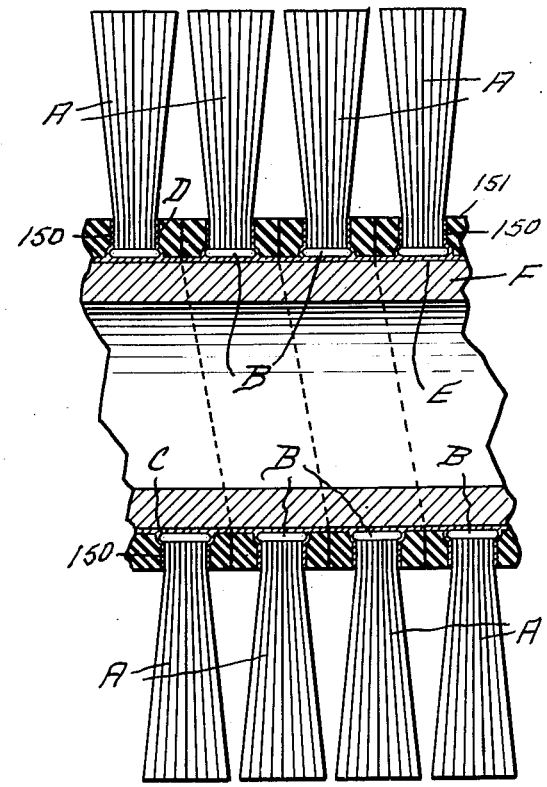
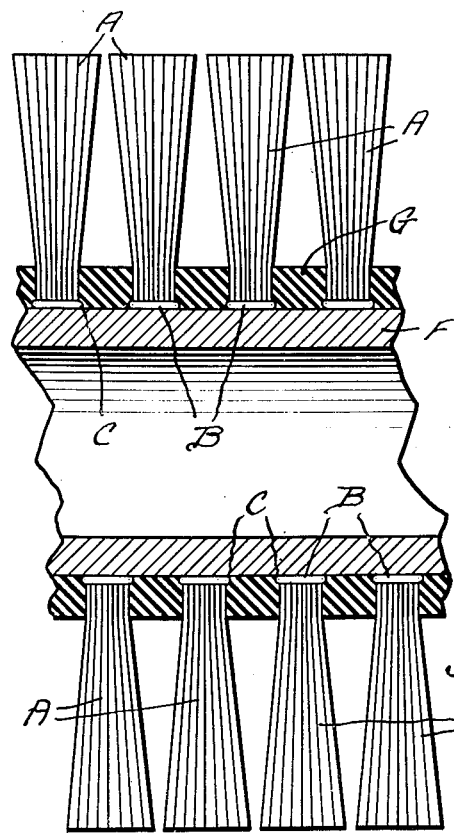

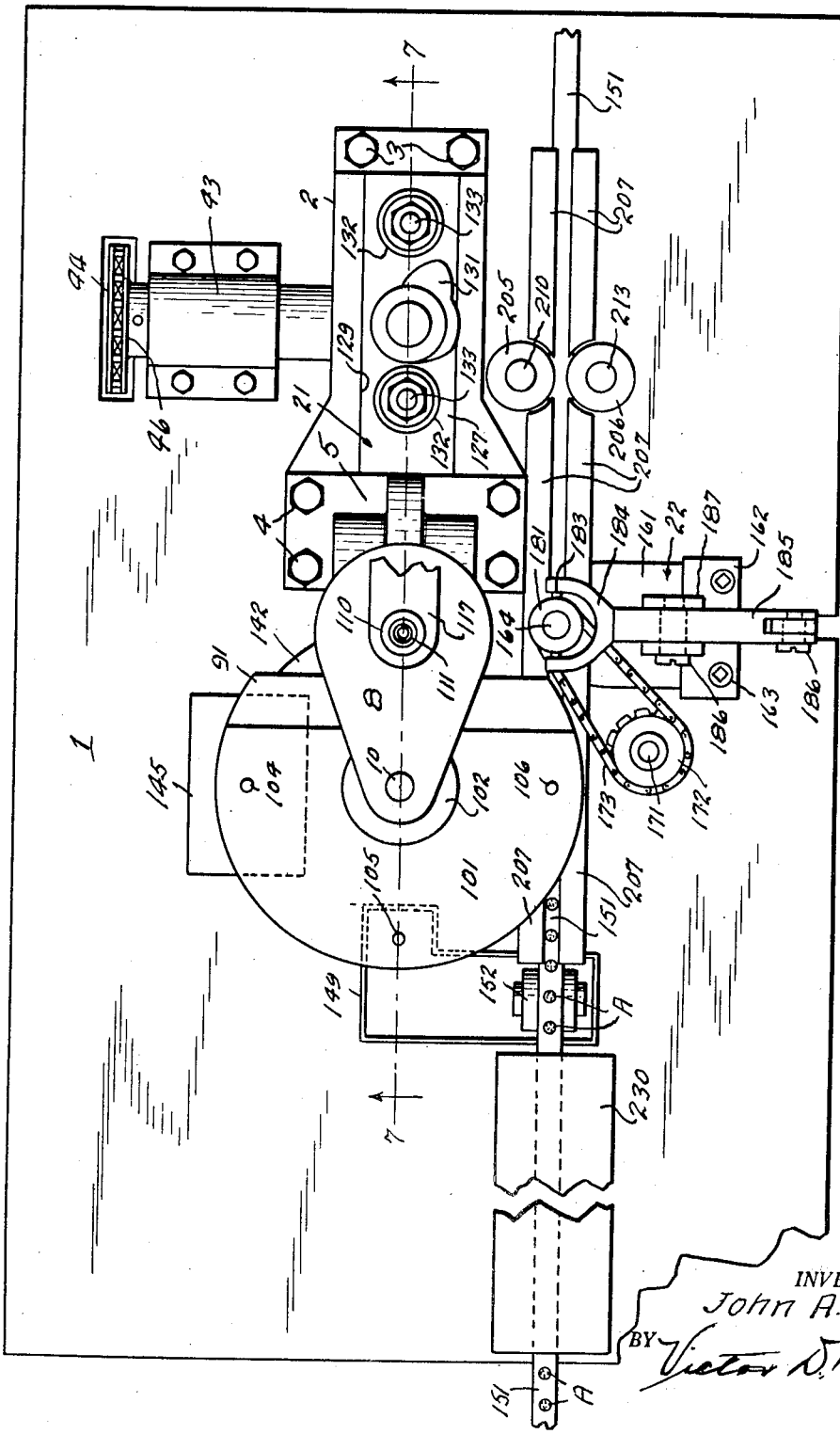

Nov. 27, 1951 J. A. STARR 2,576,546
METHOD OF MAKING BRUSHES
Filed Oct. 7, 1948 9 Sheets-Sheet 5

INVENTOR.
John A. Starr
BY
Victor D. Borst
Atty.

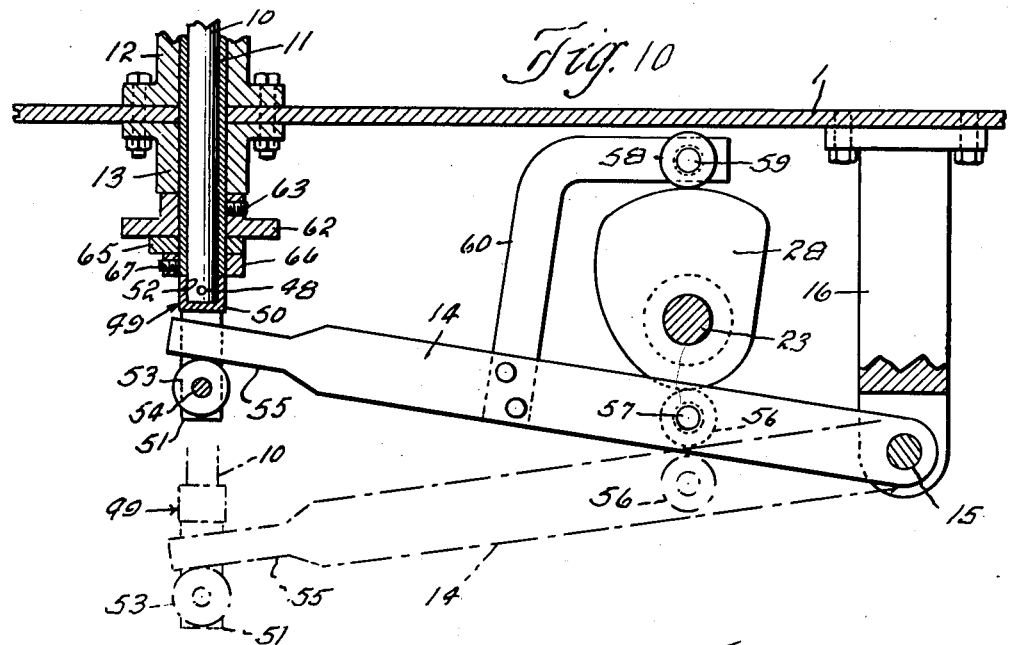
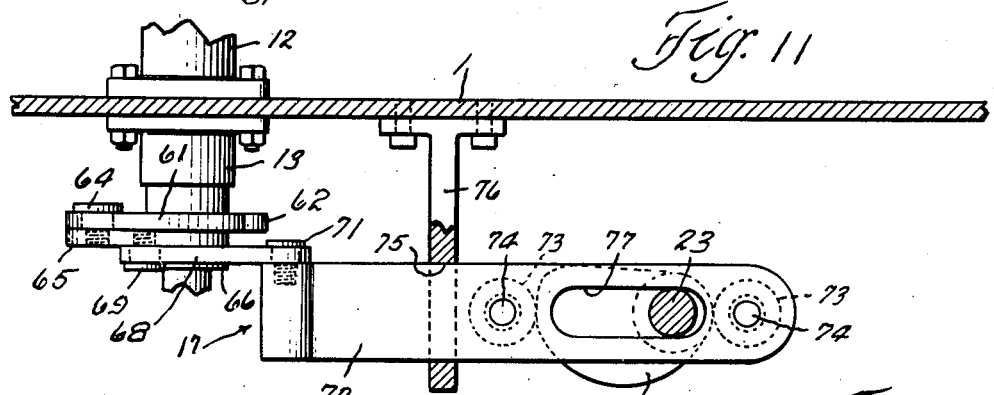
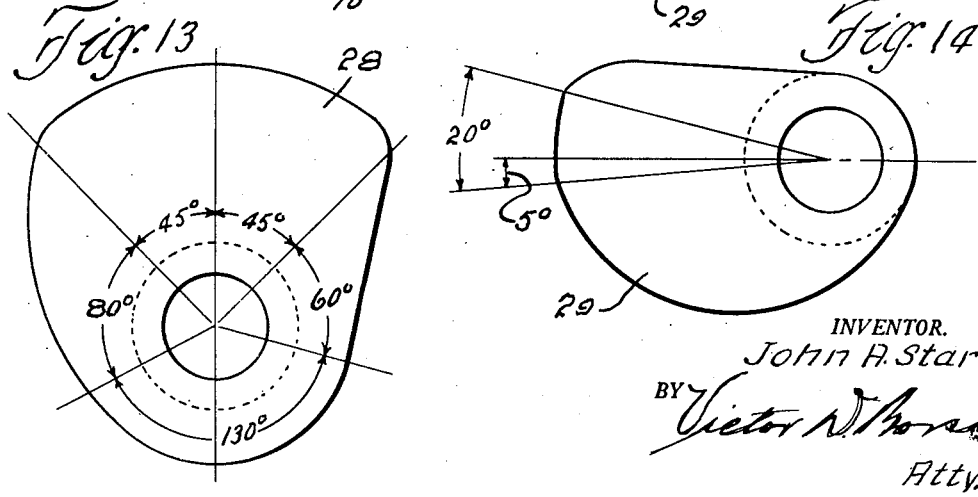

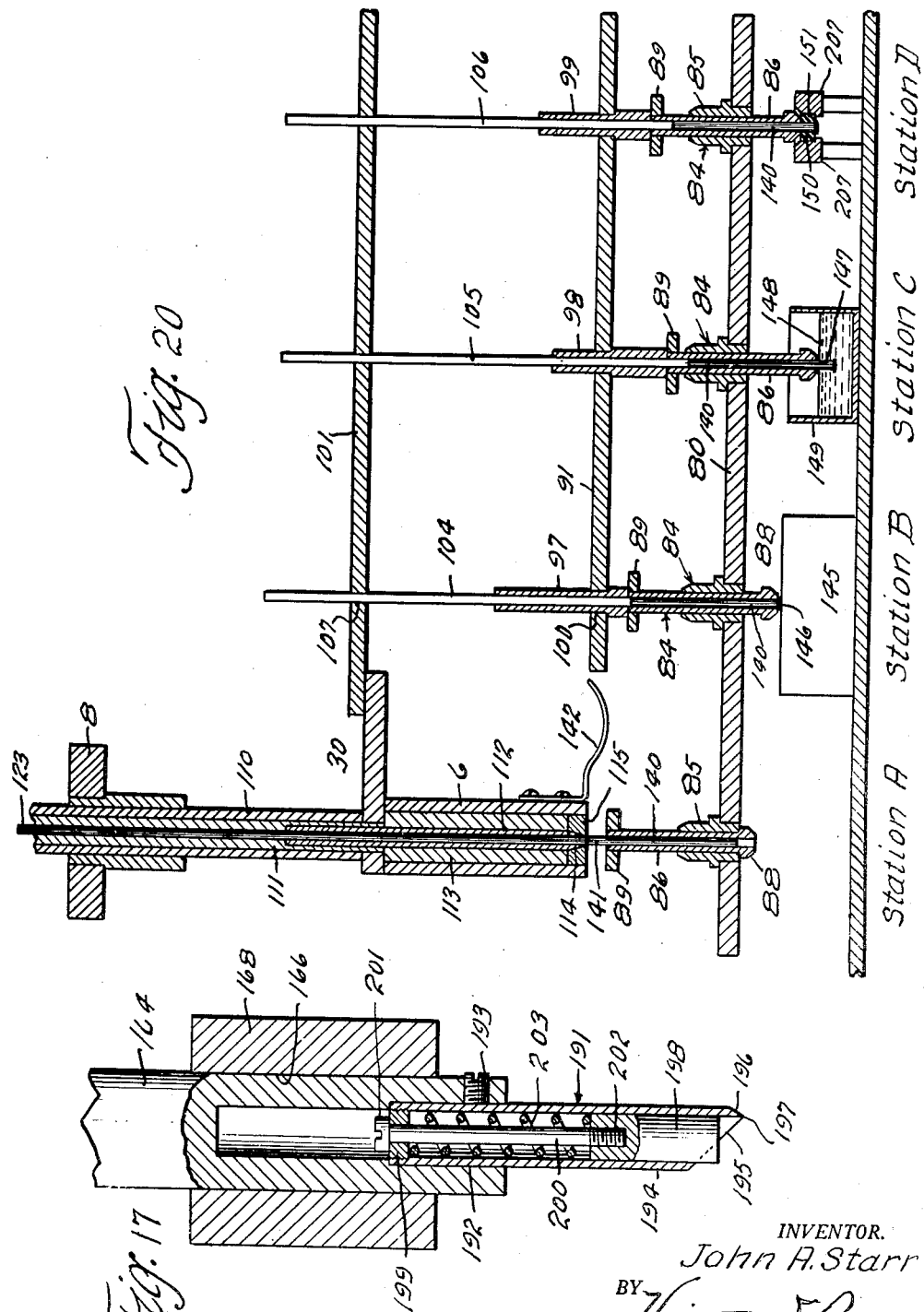

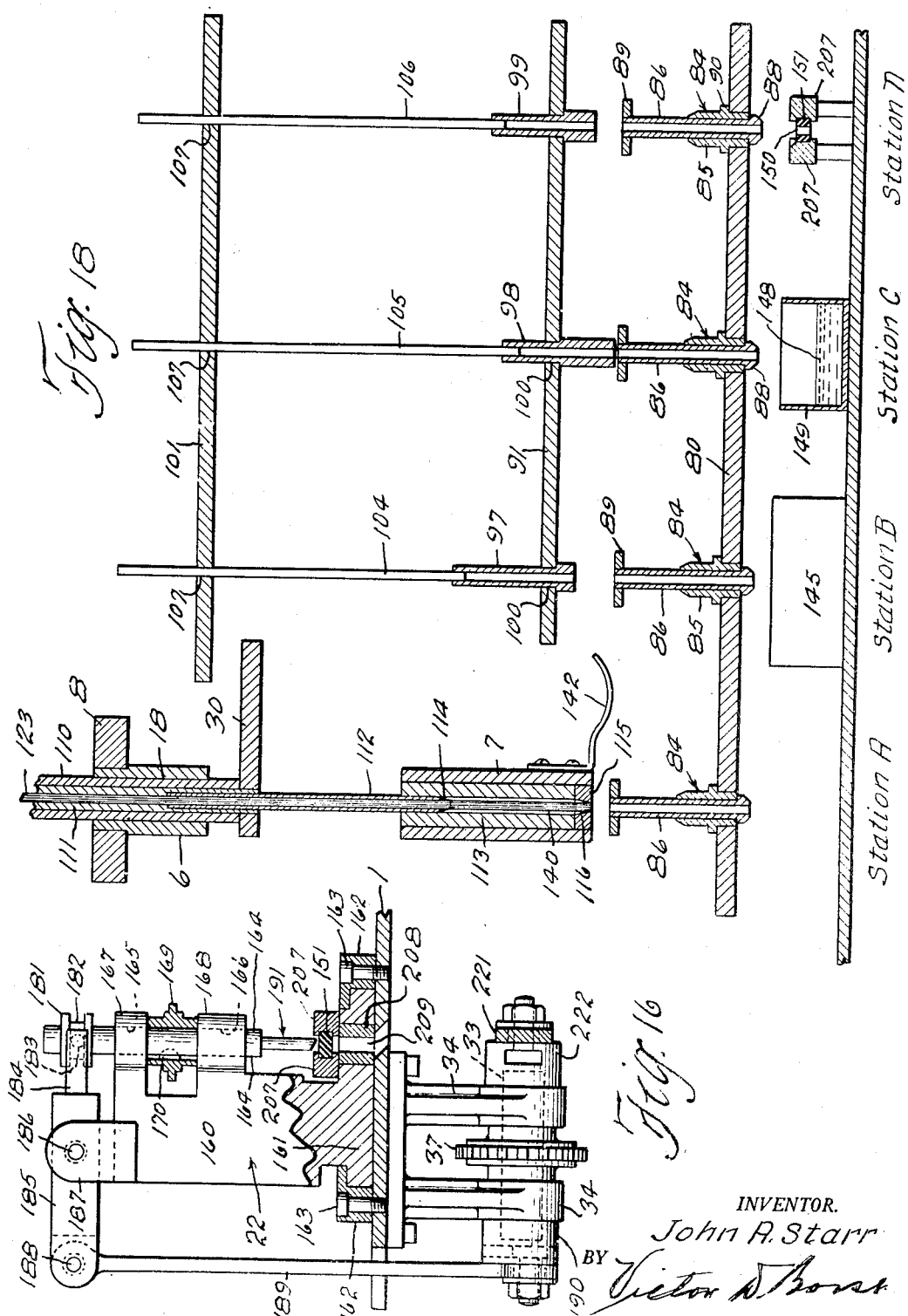

Nov. 27, 1951 J. A. STARR 2,576,546
METHOD OF MAKING BRUSHES
Filed Oct. 7, 1948 9 Sheets-Sheet 9

INVENTOR.
John A. Starr
BY
Atty.

Patented Nov. 27, 1951

2,576,546

UNITED STATES PATENT OFFICE 2,576,546

METHOD OF MAKING BRUSHES

John A. Starr, Riverdale, N. Y., assignor to M. W. Jenkins Sons, Inc., Cedar Grove, N. J., a corporation of New Jersey Application October 7, 1948, Serial No. 53,340

10 Claims. (Cl. 300—21)

1

This invention relates to a method of making tufted brushes having bristles of plastic material. The bristles may be made from any suitable plastic which is solid and hard at temperatures under 250° F., but which will soften and liquify when sufficient heat is applied thereto and will again harden and solidify when cooled. Experience has shown that brushes having bristles made from nylon filaments are very serviceable and are particularly adapted for certain uses.

In making brushes according to my improved method, I first form individual plastic bristle tufts comprising a plurality of bristles extending upwardly from a thin hard solid base which is integral with the bristles. The base is of slightly greater area than the area of the bristles at their junction with the base so that I have in effect an annular bead about the base of the bristles. In making the individual tufts I combine a multiplicity of endless plastic filaments of the desired diameter into a rope of filaments. From the rope of filaments I successively cut sections of predetermined length. I then subject one end of each of these sections to sufficient heat to fuse the ends of the bristles together to form the thin solid beaded base integral with the bristles. Then I apply rubber cement to the base and lower ends of the bristles after which I insert the lower ends of the tufts into spaced apertures through a narrow endless strip of uncured rubber with the beaded base of the tufts embedded in the rubber strip and the bottom thereof flush with the underside of the strip. Next I apply a thin coat of cement to the underside of the strip and to the base of the tufts after which I pass the rubber strip with the tufts secured thereto through a heating and drying chamber wherein the rubber cement is dried until it is no longer tacky. The rubber strip is then tightly wound upon a suitable core with the edges of adjacent convolution in contact. The core with the uncured rubber strip wound upon it is then subjected to sufficient heat to cure it and cause it to form a hard homogeneous sheet about the core.

The principal object of my invention is to provide a method of making tufted brushes, having plastic bristles, which will speed up the manufacture of brushes of this type and thereby materially reduce the cost thereof.

Another object of my invention is to provide a method of making tufted brushes which will produce brushes superior to those made by other known methods.

Other and more limited objects of the inven-

2 tion will be apparent from the following specification and the accompanying drawings forming a part thereof wherein:

Fig. 1 is a side elevation of an individual tuft such as is used in making brushes according to my improved method;

Fig. 2 is a view similar to Fig. 1 showing a film of rubber cement applied to the base and lower end thereof;

Fig. 3 is a sectional side elevation showing a plurality of cemented tufts secured in apertures in an uncured rubber strip with the bases of the tufts embedded in the strip flush with the underside of the strip, and a thin layer of rubber cement applied to the underside of the strip and to the bases of the tufts;

Fig. 4 is a fragmentary vertical sectional view showing the uncured rubber strip with the tufts secured thereto helically wound upon a core after it has been passed through a drying chamber wherein the rubber cement was dried;

Fig. 5 is a fragmentary vertical sectional view through a completed brush showing the rubber strip and the rubber cement cured into a solid hard homogeneous sheet upon the core;

Fig. 6 is a top plan view of a machine especially adapted for automatically forming individual bristle tufts, and inserting them in spaced apertures through an endless narrow strip of uncured rubber according to my improved method;

Fig. 8 is a horizontal section taken on the line 8—8 of Fig. 7;

Fig. 9 is a horizontal section taken on the line 9—9 of Fig. 7, and showing in plan the driving mechanism by which the various elements of the machine are operated in timed relation to each other;

Fig. 10 is a vertical section taken substantially on the line 10—10 of Fig. 9;

Fig. 11 is a vertical section taken on the line 11—11 of Fig. 9;

Fig. 12 is a vertical section taken on the line 12—12 of Fig. 9;

Fig. 13 is a detail view of one of the operating cams;

Fig. 14 is a detail view of another operating cam;

Fig. 15 is a fragmentary section taken on the line 15—15 of Fig. 8;

Fig. 16 is a vertical section taken substantially on the line 16—16 of Fig. 8;

Fig. 17 is an enlarged vertical section through the rotating punch by which the holes are cut through the rubber strip; and Figs. 18, 19 and 20 are diagrammatic views illustrating the operation of the machine.

Figure 7:
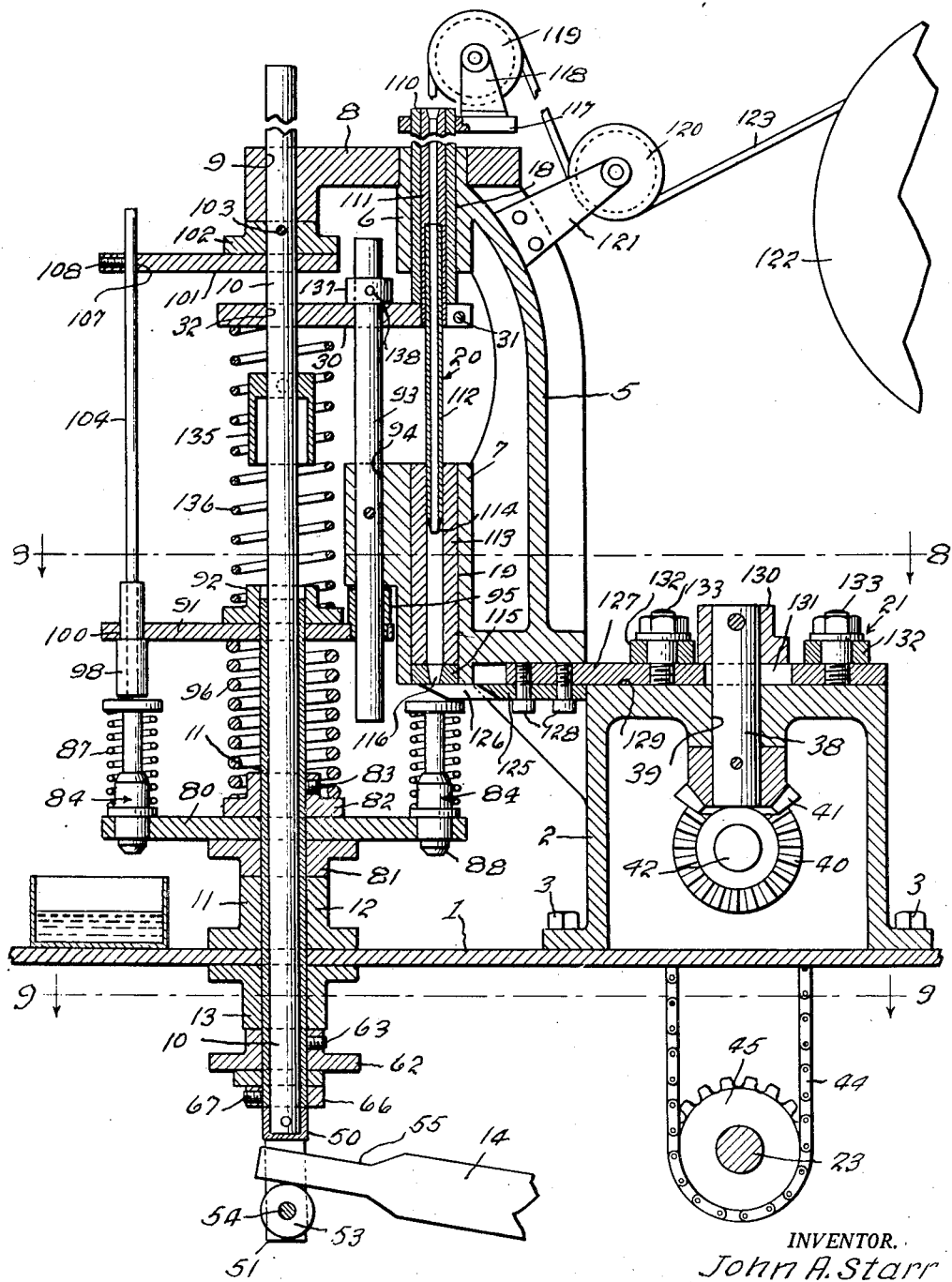
Fig. 7 is a central vertical section taken on the line 7—7 of Fig. 6.

Referring now to the drawings by reference characters, the letter A indicates an individual tuft of plastic bristles which at one end thereof have been fused together to form a hard solid base B integral with the bristles and having an annular bead C therearound. After the tufts A are formed a thin layer D of rubber cement is applied to the base B and around the lower end of the tuft by immersing the lower end of the tuft in a cement bath. The cemented ends of the tufts are then inserted in apertures 150 through an endless narrow strip 151 of uncured rubber. The beaded base B is embedded in the strip 151 with the bottom of the base flush with the underside of the strip 150. After tufts A have been inserted in the apertures 150 a thin layer E of rubber cement is applied to the underside of the strip and to the bottoms of the bases B. The strip 150 with the tufts A secured thereto is then passed through a drying chamber 230 (Fig. 6) wherein the rubber cement is dried until it is no longer tacky. After passing through the drying chamber 230 the strip 151 is tightly wound upon a core F with the edges of adjacent convolutions contacting each other as is shown in Fig. 4. The core F with the strip 151 wound thereon is then placed in a suitable chamber where sufficient heat is applied thereto to cure and harden the rubber strip. As the rubber strip is curing the convolutions thereof on the core F all fuse together and form a hard homogeneous sheet G with the base end of the tufts A firmly embedded and held therein as shown in Fig. 5.

In Figs. 6 to 20, inclusive, I have illustrated a machine for automatically forming individual bristle tufts, such as shown in Fig. 1, applying cement to the lower ends thereof and inserting them in apertures through an endless narrow strip of uncured rubber, all in accordance with my improved method of making tufted brushes. This machine per se forms no part of this application but is the subject matter of my co-pending application Serial No. 53,339, filed October 7, 1948.

In making bristle tufts with this machine I first combine a plurality of long plastic filaments into a rope, one end of which is inserted into the feeding mechanism of the machine. The machine comprises generally a rope feeding mechanism, a turret having four holders thereon and four stations past which the holders are successively advanced by the turret with an intermittent movement. The machine also includes means for punching and advancing a long strip of uncured rubber in timed relation with the operation of the rest of the machine. At the first station a predetermined length of the filament rope is inserted into each holder and cut off as the holders are successively brought into register with the rope feeding mechanism. The holders are then advanced to the second station with the severed sections of the rope therein. Here the rope section is forced downwardly in the holder until about $\frac{3}{32}$ of an inch thereof projects from the bottom thereof, after which the holder is moved downwardly until the projecting end of the rope is brought into engagement with a heating element which softens and fuses the ends of all the filaments together. The holder is then advanced to the third station, during which time the fused ends of the filaments cool and solidify into a thin hard sheet integral with the filaments and of slightly greater diameter than the diameter of the rope of filaments. At the third station the rope section is further projected from the bottom of the holder after which the holder is moved downwardly to immerse the projecting end of the rope section in rubber cement. The holder is then advanced to the fourth station to which the rubber strip, after being punched, is also advanced in timed relation to the movement of the holders. Here the holder is moved downwardly to insert the projecting cemented end of the tuft into a registering hole in the rubber strip. As the holder is retracted, the tuft which is held by the rubber strip is completely withdrawn from the holder. The foregoing operations are successively repeated with each holder as the holders are, respectively, intermittently moved to successive stations by the turret.

Referring now to Figs. 6 to 20, inclusive, by reference characters, the numeral 1 indicates a table top which is supported by suitable legs, not shown. A gear case 2 is secured to the upper side of the table top 1 by bolts 3. Secured to the top of the gear case 2 by bolts 4 at one side thereof is an upwardly extending bracket 5 which has upper and lower bosses 6 and 7, respectively, formed integral therewith. An arm 8 is secured to the top of the bracket 5 about the upper end of the boss 6 and extends outwardly therefrom. The free end of the arm 8 has a vertical bore 9 therethrough in which the upper end of a non-rotatable reciprocal rod 10 is slidably mounted. The lower end of the rod 10 is slidably mounted in and extends through a cylindrical sleeve 11 which is rotatably mounted in bearings 12 and 13 which are suitably secured to the top and bottom, respectively, of the table top 1 in axial alinement with the bore 9. The rod 10 is intermittently reciprocated, with a dwell at the end of its movement in each direction, by an oscillatory arm 14 which is pivotally connected at 15 to bracket 16 which is secured to and extends downwardly from the underside of the table top 1; and the sleeve 11 is intermittently rotated, in timed relation, to the reciprocation of the rod 10, by a ratchet and pawl mechanism generally indicated by the numeral 17.

The bosses 6 and 7 have axially alined vertical bores 18 and 19, respectively, therethrough in which is mounted the rope feeding mechanism generally indicated by the numeral 20. A cutting mechanism generally indicated by the numeral 21 is mounted on the gear case 3 and is operative to successively cut sections of predetermined length from the rope of filaments as the rope is intermittently fed downwardly in predetermined lengths by the rope feeding mechanism. The strip feeding and punching mechanism is generally indicated by the numeral 22. The rod 10, the sleeve 11, the rope feeding mechanism 20, the cutting mechanism 21, and the strip feeding and punching mechanism 22 are all operated in timed relation to each other from a shaft 23 which is rotatably supported by brackets 24 and 25 which are secured to and extend downwardly from the underside of the table top 1. The shaft 23 is constantly rotated during operation by any suitable source of power (not shown) through a drive chain 26 and a sprocket 27 which is rigidly secured to the shaft 23. The arm 14, through which the rod 10 is reciprocated, is oscillated by a cam 28 which is pinned or otherwise secured to the shaft 23; and the ratchet and pawl mechanism 17, through which the sleeve 11 is intermittently rotated through 90° at a time, is driven by a cam 29 secured to the shaft 23 adjacent the cam 28. The rope feeding mechanism 20 is operated by the rod 10 through an arm 30, which is rigidly secured at one end thereof, to a part of the rope feeding mechanism, as indicated at 31. Near the other end of the arm 30 is an aperture 32 through which the rod 10 extends, and in which the rod 10 is freely slidable. The strip feeding and punching mechanism is operated from a short shaft 33 which is rotatably supported by brackets 34 secured to and extending downwardly from the underside of the table top 1, and the shaft 33 is constantly rotated by the shaft 23 through a drive chain 35 and sprockets 36 and 37 secured to the shafts 23 and 33, respectively. The cutting mechanism 21 is operated from a short vertical shaft 38 which is rotatably supported in a bearing 39 in the gear case 2. The shaft 38 is driven through bevel gears 40 and 41 from a short horizontal shaft 42 which is rotatably supported by a bracket 43 secured to and extending upwardly from the table top 1; and the shaft 42 is constantly driven from the shaft 23 through a drive chain 44 and sprockets 45 and 46 secured to the shafts 23 and 42, respectively.

Secured to the lower end of the rod 10 by a pin 48 is an extension generally indicated by the numeral 49. This extension comprises a base 50 and a pair of spaced arms 51 extending downwardly therefrom. The base 50 has a vertical cylindrical recess 52 therein into which the lower end of the rod 10 fits. A roller 53 is rotatably supported between the arms 51 near the lower end thereof by a pin 54 which is secured to and extends between the arms 51. The free end of the arm 14 is reduced as indicated at 55 and extends between the arms 51 above the roller 53 and under the base 50. Then, as the arm 14 is oscillated between the position shown by full lines and the position shown by dot and dash lines shown in Fig. 10, the rod 10 will be reciprocated between the position shown by full lines and the position shown by dot and dash lines. The arm 14 is moved from the full line position to the dot and dash line position in Fig. 10 by the cam 28 engaging a roller 56 which is rotatably mounted upon a stud 57 secured to the arm 14; and is moved back from the dot and dash line position to the full line position by the cam 28 engaging a roller 58 which is rotatably mounted upon a stud 59 carried by an arm 60 which is secured, as shown, to the arm 14. By reference to Figs. 10 and 13 it will be seen that the shape of the cam 28 is such that it will cause a dwell in the movement of the arm 14 and consequently the rod 10, at both the upper and lower limits of their movement.

The ratchet and pawl mechanism 17, shown in detail in Figs. 9, 10 and 11, which intermittently rotates the sleeve 11 comprises a pawl 61 and a four-toothed ratchet 62. The ratchet 62 is secured to the sleeve 11 directly below the bearing 13 by a set screw 63, and the pawl 61 is pivotally secured at 64 to the outer end of an arm 65 which is rotatably mounted upon the sleeve 11 between the ratchet 62 and a collar 66 which is secured to the lower end of the sleeve 11 by a set screw 67. The pawl 61 is resiliently held in engagement with the ratchet 62 by any suitable means. One end of a link 68 is pivotally connected to the arm 65 as indicated at 69, and the other end thereof is pivotally connected to a slide 70, as indicated at 71. The slide 70 is reciprocated by the cam 29 which engages rollers 73 mounted on studs 74 carried by the slide 70. The slide 70 extends through a slot 75 in a bracket 76 which is secured to and extends downwardly from the underside of the table top 1, and the slide 70 has an elongated slot 77 therethrough through which the shaft 23 extends. This arrangement accurately guides the slide 70 as it is reciprocated by the cam 29. From this it will be seen that, as the slide 70 is reciprocated, the arm 65 will be oscillated about the sleeve 11 as a pivot, and that through the pawl 61 and the ratchet 62, the sleeve 11 will be intermittently rotated. The arrangement and proportions of the parts are such that for each movement of the slide 70 in one direction, the sleeve 11 will be indexed through 90°, and during the movement of the slide 70 in the opposite direction, the sleeve 11 will remain stationary. The mechanism for reciprocating the rod 10 and the indexing mechanism for the sleeve 11 are so timed with respect to each other that the rod 10 will be reciprocated during each swell of the sleeve 11.

A turret disc 80, having flanged collars 81 and 82, secured to opposite sides thereof is rigidly secured to the sleeve 11 by a set screw 83, with the collar 81 seating on the upper end of the bearing 12. The set screw 63, by which the ratchet 62 is secured to the sleeve 11, and the set screw 83, by which the disc 80 is secured to the sleeve 11, cooperate with each other to hold the sleeve 11 against vertical movement. The disc 80 has four holders 84 mounted therein. These holders are all equidistant from the axis of the sleeve 11 and are spaced 90° from each other.

Each holder 84 comprises a bushing 85, a reciprocal sleeve 86 and a spring 87. The bushings 85 are secured in apertures in the disc 80 and the sleeves 86 are slidably mounted in the bushings 85. Each sleeve 86 has an enlarged conical head 88 formed on the lower end thereof and a collar 89 removably secured to the upper end thereof. The springs 87, which are disposed about the sleeves 86 between the collars 89 and flanges 90 on the bushings 85, normally hold the sleeves 86 in their uppermost position, but will allow them to be moved downwardly as will be hereinafter described.

A plate 91 having a flanged collar 92 secured thereto is slidably mounted upon the upper end of the sleeve 11. The plate 91 is adapted to be moved up and down upon the sleeve 11, but is held against rotation by a rod 93 which is rigidly secured in a bore 94 in the boss 7 and extends through a bushing 95 carried by the plate 91. A spring 96, which is disposed about the sleeve 11 between the disc 80 and plate 91 normally holds the plate 91 in its uppermost position which is determined by the bushing 95 engaging the boss 7. The plate 91 has three bushings 97, 98 and 99 mounted thereon which extend through apertures 100 in the disc 91. The bushings 97, 98 and 99 are all equidistant from the axis of the sleeve 11 with the bushing 97 disposed 90° to one side of the bushing 98 and the bushing 99 disposed 90° to the other side of the bushing 98. The axis of the rope feeding mechanism 20 is disposed midway between the bushings 97 and 99 diametrically opposite the bushing 99, as is clearly shown in Fig. 2.

A plate 101, having a flanged collar 102 secured thereto, is pinned to the rod 10 between the arms 8 and 30 as indicated at 103. The plate 101 carries three ejector rods 104, 105 and 106 which are adjustably held in apertures 107 in the plate 101 by set screws 108. The rods 104, 105 and 106 extend downwardly from the plate 101 and into the bushings 97, 98 and 99, respectively.

The rope feeding mechanism 20 comprises a piece of steel tubing 110 which is slidably mounted in the bore 18 in the boss 6. Removably secured in the tubing 110 is a sleeve 111 of case hardened steel. The sleeve 111 extends a short distance out of the lower end of the tubing 110 and has the arm 30 secured thereto by the bolt 31. A thin walled tube 112 of stainless chrome steel is secured in the lower end of the sleeve 111 and extends downwardly therefrom into the upper end of a bronze bushing 113 which is mounted in the bore 19 in the boss 7. The lower end of the tube 112 has a conical taper 114 formed thereon. A tool steel plug 115 having a conical aperture 116 complementary to the taper 114 is secured in the lower end of the bore 19 beneath bushing 113. As the tubing 110 is reciprocated, as will be hereinafter described, the tapered end 114 of the tube 112 will seat in the conical aperture 116 when the tube is at the lower end of its movement. An arm 117 which is rigidly secured to the upper end of the tubing 110 has a pair of spaced brackets 118 mounted thereon between which is rotatably supported a grooved pulley 119. A second pulley 120 is rotatably supported between spaced brackets 121 secured to the bracket 5. The numeral 122 indicates a reel upon which the rope 123 of plastic filaments is wound and from which the rope is withdrawn during operation. The rope of filaments 123 is fed from the reel 122, thence under the pulley 120 and then up over the pulley 118 and down through the sleeve 111 and tube 112 to the end 114 of the tube 112. Most plastic filaments capable of being used in forming bristle tufts have a very abrasive effect upon the sleeve 111 and the tube 112. With the construction shown these parts can be readily replaced after they become worn.

The cutting mechanism 21 comprises a blade 125 having a diagonal beveled cutting edge 126. The blade 125 is removably secured to a reciprocal slide 127, by bolts 128, which is slidably mounted in a slot 129 formed in the top of the gear case 2. The slide 127 has an elongated slot 130 therethrough through which the shaft 38 extends, and it is reciprocated by a cam 131 which is secured to the upper end of the shaft 38 and, as it is rotated, engages rollers 132 rotatably mounted on studs 133 carried by the slide 127. The blade 125 engages the lower end of the plug 115 and as it is reciprocated, the cutting edge 126 of the blade cooperates with the plug to shear off sections from the rope 123 which have been projected out through the aperture 116 by the rope feeding mechanism 20.

As previously stated, all of the various mechanisms which have been described in detail are operated in timed relation to each other from the shaft 23 which is constantly rotated during operation. As the rod 10 is moved downwardly by the arm 14 it carries the plate 101 down with it, which in turn moves the ejector rods 104, 105 and 106 down through the bushings 97, 98 and 99, respectively, as is shown in Figs. 18, 19 and 20. After the rod 10 has been moved downwardly a short distance, the plate 101 engages the arm 30 after which the plate 101 and arm 30 move downwardly together. As the arm 30 is moved downwardly it in turn pulls the tubing 110 and all of the parts carried thereby downwardly until at the lower limit of movement of the rod 10, the conical end 114 of the tube 112 seats in the conical aperture 116 in the plug 115. Upon a predetermined further movement of the rod 10, after the plate 101 engages the arm 30, a cup-shaped member 135, rigidly secured to the rod 11, will engage the top of the collar 92 secured to the plate 91, after which the plates 91 and 101 and the arm 30 will all move downwardly together. As the plate 91 is moved downwardly about the sleeve 11 by the cup-shaped member 135, the member 135 will telescope the upper end of the sleeve 11. As the plate 91 is moved downwardly, the lower ends of the bushings 98, 99 and 97 will successively engage the upper ends of the sleeves 86 of the holders 84 thereunder and upon further movement of the plate 91, the bushings 97, 98 and 99 will depress the sleeves 86 of the holders 84 in the bushings 85 thereof against the pressure of the springs 87, which will return the sleeves 86 to their initial position as the plate 91 moves back to its initial position.

As the rod 10 is moved upwardly by the cam 28 and arm 14, it will carry the plate 101 and the ejector rods 104, 105 and 106 up with it and the spring 96 will return the plate 91 and bushings 97, 98 and 99 thereon back to their initial positions. A spring 136, which surrounds the rod 10 between the plate 91 and the arm 30, is provided to return the rope feeding mechanism 20 to its initial position.

The up and down travel of the rod 10 is always constant and cannot be changed or adjusted. Consequently, in order to adapt the apparatus for forming different lengths of tufts, means are provided by which the length of the stroke of the rope feeding mechanism can be varied as the length of the stroke of the rope feeding mechanism determines the amount of rope fed during each cycle, and this in turn determines the length of the tuft. Means are also provided by which the initial position of the ejector rods 104, 105 and 106 can be changed in accordance with any change in the stroke of the rope feeding mechanism. In order to adjust the stroke of the feeding mechanism 20, it is only necessary to adjust the initial position thereof, as the rope feeding mechanism will not start to move downwardly until the plate 101 engages the arm 30. This adjustment is accomplished by means of a stop 137 which is adjustably secured to the upper end of a rod 93 by a set screw 138. In order to change the initial position of the ejector rods 104, 105 and 106 it is only necessary to loosen the set screws 108 and move the rods to the desired position, after which the screws 108 are again tightened.

As previously stated, the cam 28 is so shaped as to produce a dwell in the movement of the rod 10 at both the upper and lower limits of its movement, which in turn will produce like dwells in the various mechanisms operated by the rod 10. As the rope feeding mechanism moves downwardly, it projects a predetermined length of rope out through the aperture 116 and into a holder 84 therebelow. Then, during the dwell at the lower limit of its movement, the cutting blade 125 is moved towards the projecting section of rope until the cutting edge 126 just engages the rope. The blade 125 then dwells holding the rope stationary, while the rope feeding mechanism returns to its initial position, after which the blade 125 is moved on farther to shear the projecting section 140 from the rope, leaving it in the holder 84 with the end 141 thereof projecting a short distance above the holder as shown in Figs. 10 and 20.

As the rope feeding mechanism 20 returns to its initial position, a new section of rope is withdrawn from the reel 122, and the next section 140 is left extending from the end of the tube 112 into the bushing 113 in readiness to be projected out through the aperture 116 and into the next holder 84.

All of the above described operations occur during the dwell in the movement of the turret disc 80. After the rod 10 has been returned to its uppermost position and all of the mechanisms operated thereby have returned to their initial positions, the ratchet and pawl mechanism 17 indexes the turret disc 80 through 90°, after which it dwells while the rod 10 and various mechanisms connected thereto are again operated.

As the turret disc is indexed around it advances the holders 84 successively past four stations A, B, C and D at which stations the holders dwell as the various mechanisms described are operated. At station A, section 140 of predetermined length is projected from the rope feeding mechanism and into a holder 84 therebelow, after which the section is sheared off leaving the upper end 141 thereof extending a short distance above the holder, as has been described. As each holder 84 moves from station A to station B, the projecting end 141 of the rope section 140 is engaged by a spring arm 142 which depresses the section 140 within the holder 84 until the upper end thereof is flush with the top of the holder. The spring arm 142 is secured to one side of the boss 7 as indicated at 143 in Figs. 8 and 15.

At station B, the ejector rod 104 first forces the section 140 downwardly in the sleeve 86 of the holder 84 until the lower end of the section extends out of the sleeve a very short distance, about $\tfrac{1}{32}$nd to $\tfrac{1}{16}$th of an inch. The sleeve 86 is then moved downwardly from the position shown in Fig. 19 to the position shown in Fig. 20 by the bushing 97 until the projecting end of the section is brought into engagement with a suitable heating element 145 as indicated at 146. The heating element 145 heats and softens the ends of the filaments causing them to all fuse together. From station B, the holders 84 are advanced to station C. While the holders are advancing from station B to station C, the fused ends of the section of filaments cools and hardens into a thin solid base B integral with the filaments and slightly greater in diameter than the diameter of the section 140, thus forming the bead C around the lower end of the section.

At station C, the ejector rod 105 forces the lower ends of the sections 140 from the sleeves 86 still further, as indicated at 147, and then the bushing 98 depresses the sleeve 86 from the position shown in Fig. 19 to the position shown in Fig. 20 until the projecting end of the section is immersed in rubber cement 148 in a pan 149, to apply a thin film of cement to the immersed end of the section.

From station C, the holders 84 are advanced to station D where the cemented ends 147 of the sections 140 are successively inserted in apertures 150 in a relatively narrow thin endless strip 151 of uncured rubber, which is advanced to station D in timed relation to the advancement of the holders 84 thereto. The insertion of the ends 147 into the apertures 150 is accomplished by the downward movement of the sleeves 86 from the position shown in Fig. 19 to the position shown in Fig. 20. The wet cement on the ends 147 acts as lubricant and facilitates the insertion of the ends into the apertures 150. The ejector rod 106 merely acts as a stop to prevent the section 140 being forced back into the sleeve 86 as the end 147 is being forced into the aperture 150.

The operation of the apparatus as just described is shown diagrammatically in Figs. 18, 19 and 20. In Fig. 18 the various mechanisms are shown in their initial positions with the end of the rope 123 flush with the bottom of the plug 115 ready to be projected out through the aperture 116 into the holder 84 therebelow. In Fig. 19 the various mechanisms are shown in the positions they assume just as the cup-shaped member 135 engages the collar 92 on the plate 91 preparatory to moving the plate 91 downwardly. In this position, the end section 140 of the rope 123 has been only partially inserted in a holder 84, and the ejector rods 104, 105 and 106 have been moved downwardly until they extend out below the bottoms of the bushings 97, 98 and 99, respectively. In Fig. 20 the various mechanisms are shown at the lower limits of their movement. From the psition shown in Fig. 20 the various mechanisms move back to their initial positions as shown in Fig. 18 which completes the cycle of operation.

After the rubber strip 151 leaves station D with the sections 140 secured in the apertures 150, it passes over a roller 152 which takes cement from the pan 149 and applies it to the bottom of the strip. After leaving the roller 152, the strip 151 passes through a drying chamber 230 where the cement is dried. After leaving the drying chamber the strip 151, with the sections 140 securely cemented in the apertures 150, may be immediately wound upon a core or mandrel to form a brush or it may be coiled and stored for future use.

The mechanism 22 for cutting the apertures 150 in the strip 151 and feeding the strip past station D in timed relation to the operation of the rest of the apparatus will now be described. The mechanism is all operated by the shaft 33 which is constantly rotated during operation by the main shaft 23 through the drive chain 35 and the sprockets 36 and 37 as previously described. The punching mechanism is mounted upon a standard 160 which extends upwardly from a base 161 which is adjustably secured to the top of the table 1 by clamps 162 and bolts 163. A punch holder 164 is reciprocally and rotatably mounted in alined bearings 165 and 166 in spaced bosses 167 and 168 integral with the standard 160. A sprocket 169 is slidably keyed upon the punch holder 164 between the bosses 167 and 168 as indicated at 170. The punch holder 164 is constantly rotated at high speed during operation from a vertical shaft 171 by a sprocket 172 secured to the upper end of the shaft 171, a drive chain 173 and the sprocket 169. The vertical shaft 171 which extends down through the table top 1 is rotatably supported by a suitable bearing bracket 174 secured to the underside of the table top 1. Secured to the lower end of the vertical shaft 171 is a bevel gear 175 which meshes with a bevel gear 176 secured to one end of a horizontal shaft 177, rotatably supported in a suitable bearing bracket 178 secured to and extending down from the underside of the table top 1. A pulley 179, which is driven from any suitable source of power by a belt 180, is secured to the other end of the horizontal shaft 177. The shaft 171 is thus driven by the belt 180 through the pulley 179, shaft 177 and bevel gears 176 and 175.

Secured to the upper end of the punch holder 164 is a wheel 181 having an annular groove 182 therein. A pair of diametrically opposite pins 183 which are carried by a yoke 184 extend into the groove 182. The yoke 184 is secured to one end of a rocker arm 185 which is rotatably mounted on a shaft 186 between spaced arms 187 integral with the standard 160. The other end of the rocker arm 185 is pivotally connected at 188 to the upper end of a connecting rod 189. The lower end of the connecting rod 189 is connected to an adjustable crank 190 secured to one end of the shaft 33. From this it will be seen that as the shaft 33 rotates, the rocker arm 185 will be oscillated on the shaft 186. The rocker arm as it is oscillated will impart a reciprocal movement to the punch holder 164 through the yoke 184, pins 183 and wheel 181.

A cutting punch 191 is removably secured in a recess 192 in the lower end of the punch holder 165 by a set screw 193. The punch 191 comprises a thin walled tube 194 of hardened steel the lower end of which has been diagonally cut as indicated at 195. The outer wall of the tube is bevelled as indicated at 196 to provide a sharp cutting edge 197. A plunger 198 is slidably mounted in the lower end of the tube 194 and the upper end of the tube is closed by an apertured screw plug 199. A rod 200 having an enlarged head 201 is inserted through the aperture in the plug 199 and screwed into the upper end of the plunger as indicated at 202. A spring 203 disposed within the tube 194 about the rod 200 between the screw plug 199 and the inner end of the plunger 198 normally urges the plunger 198 outwardly and the head 201 limits the outward movement thereof. The plunger 198 is provided to eject the cut plug from the apertures 150 in the strip 151 as the apertures are cut by the downward movement of the rapidly rotating punch holder 164, and the punch 191 carried thereby.

The strip 151 is intermittently fed past the punch 191 and station D by a pair of intermittently driven rollers 205 and 206. A pair of spaced grooved guide rails 207 which extend from a point a short distance behind the rollers 205 and 206 up to the cement applying roller 152, as shown in Fig. 2, guide and confine the uncured rubber strip 151 and prevent any displacement thereof as it is pushed forwardly by the rollers 205 and 206. It is during the dwell in the movement of the strip 151 that the punch 191 is reciprocated to cut the apertures 150. It is also during this dwell that a section 140 of rope filament is inserted in a previously cut aperture. A hardened plug 208 having a bore 209 in alinement with the punch 191 cooperates with the punch 191 in cutting the aperture 150.

The roller 205 is secured to the upper end of a shaft 210 which is rotatably supported in suitable bearings 211 and 212 secured to the table top 1 on opposite sides thereof. The roller 206 is secured to the upper end of a shaft 213 which is rotatably mounted in suitable supports secured to the table top 1. The shaft 210 is intermittently rotated in a clockwise direction (Figs. 8 and 9) by a pawl 214 and a ratchet 215, which in turn are operated by the shaft 33 through suitable linkage. The shaft 213 is rotated in an anticlockwise direction by a gear 216 which is secured to the shaft 210 and meshes with a complementary gear (not shown) secured to the lower end of the shaft 213. The gear 216 is pinned to the shaft 210 directly below the bearings 212 and the ratchet 215 is secured to the shaft 210 directly below the gear 216. The pawl 214 is pivotally secured, as indicated at 217, to the outer end of an arm 218 which is rotatably mounted on the shaft 210 below the ratchet 215. The pawl 214 is resiliently held in engagement with the ratchet by any suitable means. One end of a link 219 is pivotally connected to the arm 218 at 220, and one end of a link 221 is connected to an adjustable crank mechanism 222 secured to one end of the shaft 33. The adjustable crank mechanisms 190 and 222 are identical and of standard well known construction. Consequently it is not believed necessary to describe them in detail herein. The links 219 and 221 are connected together by a universal coupling 223. From the foregoing it will be apparent that as the shaft 33 rotates, the arm 218 will be oscillated which will impart an intermittent rotary movement to the shaft 210 through the pawl 214 and ratchet 215; and that the same intermittent movement in the opposite direction will be imparted to the shaft 213, through the gear 216 on the shaft 210 and the complementary gear on the shaft 213.

As previously stated, the strip feeding and punching mechanism is operated in timed relation to the operation of the rest of the apparatus. The strip 151 is advanced at the same time the turret disc 80 is indexed which is during the dwell of the various other mechanism in their initial positions; and the punch 191 is reciprocated to cut the apertures 150 during the reciprocation of the rod 10 and the operation of the various mechanisms connected thereto.

From the foregoing it will be apparent to those skilled in this art that I have provided a very simple and effective method for accomplishing the objects of my invention.

It is obvious that the method may be carried out by other apparatus than that shown and described herein, as other ways and means will occur to those skilled in this art, and the invention may be otherwise variously embodied within the scope of the appended claims.

What is claimed is:

1. The method of making brushes comprising forming individual tufts of plastic bristles having the corresponding ends of said bristles fused into a thin solid sheet integral with said bristles, securing the fused ends of said tufts in spaced apertures in a narrow endless strip of uncured rubber, winding said strip upon a core with the edges of adjacent convolutions in contact with each other, and then applying sufficient heat thereto to cure said strip and cause it to fuse into a homogeneous sheet upon said core.

2. The method of making brushes comprising forming individual tufts of plastic bristles having the corresponding ends of said bristles fused into a thin solid sheet integral with said bristles, applying cement to the fused ends of said tufts, inserting the cemented ends of said tufts in alined apertures in a narrow endless strip of uncured rubber, winding said strip upon a core with the edges of adjacent convolutions in contact with each other, and then applying sufficient heat thereto to cure said strip and cause it to fuse into a homogeneous sheet upon said core.

3. The method of making brushes comprising forming individual tufts of plastic bristles having the corresponding ends of said bristles fused into a thin solid sheet integral with said bristles, securing the fused ends of said tufts in spaced apertures in a narrow endless strip of uncured rubber, applying cement to the underside of said strip, winding said strip upon a core with the cemented underside of said strip engaging said core and the edges of adjacent convolutions engaging each other, and then applying sufficient heat thereto to cure said strip and cause it to fuse into a homogeneous sheet upon said core.

4. The method of making brushes comprising forming individual tufts of plastic bristles having the corresponding ends of said bristles fused into a thin solid sheet integral with said bristles, applying cement to the fused ends of said tufts, inserting the cemented ends of said tufts in alined apertures in a narrow endless strip of uncured rubber, applying cement to the underside of said strip, winding said strip upon a core with the cemented underside of said strip engaging said core and the edges of adjacent convolutions engaging each other, and then applying sufficient heat thereto to cure said strip and cause it to fuse into a homogeneous sheet upon said core.

5. The method of making brushes comprising forming individual tufts of plastic bristles having the corresponding ends of said bristles fused into a thin solid sheet integral with said bristles, applying cement to the fused ends of said tufts, inserting the cemented ends of said tufts in alined apertures in a narrow endless strip of uncured rubber, applying cement to the underside of said strip, subjecting said strip to only sufficient heat to dry said cement, winding said strip upon a core with the cemented underside of said strip engaging said core and the edges of adjacent convolutions engaging each other, and then further heating said strip to cure said strip and cause it to fuse into a homogeneous sheet upon said core.

6. The method of making brushes comprising forming individual bristle tufts by clamping together a multiplicity of plastic bristles with the corresponding ends of said bristles in substantially the same plane, subjecting said ends to sufficient heat to fuse them together into a thin beaded base integral with said bristles, inserting said tufts into spaced apertures in a narrow endless strip of uncured rubber with said beaded bases embedded in said strip with the bottoms thereof flush with the underside of said strip, winding said strip upon a core with the bases of said tufts engaging said core and the edges of adjacent convolutions of said strip engaging each other, and then applying sufficient heat thereto to cure said strip into a hard homogeneous sheet upon said core.

7. The method of making brushes comprising forming individual bristle tufts by clamping together a multiplicity of plastic bristles with the corresponding ends of said bristles in substantially the same plane, subjecting said end to sufficient heat to fuse them together into a thin beaded base integral with said bristles, applying cement to the lower ends of said tufts, inserting the cemented ends of said tufts into spaced apertures in a narrow endless strip of uncured rubber with said beaded bases embedded in said strip with the bottoms thereof flush with the underside of said strip, winding said strip upon a core with the bases of said tufts engaging said core and the edges of adjacent convolutions of said strip engaging each other, and then applying sufficient heat thereto to cure said strip into a hard homogeneous sheet upon said core.

8. The method of making brushes comprising forming individual bristle tufts by clamping together a multiplicity of plastic bristles with the corresponding ends of said bristles in substantially the same plane, subjecting said ends to sufficient heat to fuse them together into a thin beaded base integral with said bristles, inserting said tufts into spaced apertures in a narrow endless strip of uncured rubber with said beaded bases embedded in said strip with the bottoms thereof flush with the underside of said strip, applying cement to the underside of said strip and to the bases of said tufts, winding said strip upon a core with the cemented bases of said tufts and the cemented underside of said strip engaging said core and the edges of adjacent convolutions of said strip engaging each other, and then applying sufficient heat thereto to cure said strip into a hard homogeneous sheet upon said core.

9. The method of making brushes comprising forming individual bristle tufts by clamping together a multiplicity of plastic bristles with the corresponding ends of said bristles in substantially the same plane, subjecting said ends to sufficient heat to fuse them together into a thin beaded base integral with said bristles, applying cement to the lower ends of said tufts, inserting the cemented ends of said tufts into alined apertures in a narrow endless strip of uncured rubber with said beaded bases embedded in said strip with the bottoms thereof flush with the underside of said strip, applying cement to the underside of said strip and to the bases of said tufts, winding said strip upon a core with the cemented bases of said tufts and the cemented underside of said strip engaging said core and the edges of adjacent convolutions of said strip engaging each other, and then applying sufficient heat thereto to cure said strip into a hard homogeneous sheet upon said core.

10. The method of making brushes comprising forming individual bristle tufts by clamping together a multiplicity of plastic bristles with the corresponding ends of said bristles in substantially the same plane, subjecting said ends to sufficient heat to fuse them together into a thin beaded base integral with said bristles, applying cement to the lower ends of said tufts, inserting the cemented ends of said tufts into alined apertures in a narrow endless strip of uncured rubber with said beaded bases embedded in said strip with the bottoms thereof flush with the underside of said strip, applying cement to the underside of said strip and to the bases of said tufts, subjecting said strip to only sufficient heat to dry said cement, winding said strip upon a core with the bases of said tufts engaging said core and the edges of adjacent convolutions of said strip engaging each other, and then further heating said strip to cure said strip into a hard homogeneous sheet upon said core.

JOHN A. STARR.

REFERENCES CITED

The following references are of record in the file of this patent:

UNITED STATES PATENTS

| Number | Name | Date |
|---|---|---|
| 866,784 | Glorieux | Sept. 24, 1907 |
| 1,280,944 | Barry | Oct. 8, 1918 |
| 2,061,129 | Angell | Nov. 17, 1936 |
| 2,190,206 | Churchill | Feb. 13, 1940 |
| 2,438,156 | Dodge | Mar. 23, 1948 |